(12) United States Patent
Towle et al.

(10) Patent No.: US 6,834,133 B1
(45) Date of Patent: Dec. 21, 2004

(54) OPTOELECTRONIC PACKAGES AND METHODS TO SIMULTANEOUSLY COUPLE AN OPTOELECTRONIC CHIP TO A WAVEGUIDE AND SUBSTRATE

(75) Inventors: Steven Towle, deceased, late of Phoenix, AZ (US); by Anna M. George, legal representative, Mountain View, CA (US); Daoqiang Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/649,240

(22) Filed: Aug. 27, 2003

(51) Int. Cl.$^7$ .................................................. G02B 6/12
(52) U.S. Cl. .............................. 385/14; 385/88; 385/94; 385/129
(58) Field of Search ............................... 385/14, 31, 51, 385/52, 88, 92, 94, 129–130

(56) References Cited

U.S. PATENT DOCUMENTS

2004/0057648 A1 * 3/2004 Yunus .......................... 385/14
2004/0118599 A1 * 6/2004 Chason et al. .............. 174/260

OTHER PUBLICATIONS

Baggs, J; Machon, W; Magill, P; Mis, J; Rinne, G. "Solder Alloy Selection for Flip Chip on Board." International Material and Packaging Society Symposium, Brasleton, Georgia. Feb. 1998. pp. 1–5.

Bogaerts, W; Bienstman, P; Baets, R. "Sidewall Roughness in Photonic Crystal Slabs: A Comparison of High–Contrast Membranes and Low–Contrast III–V Epitaxial Structures." 11$^{th}$ International Workshop on Optical Waveguide Theory and Numerical Modelling, Apr. 4–5, 2003, Prague, Czech Republic. pp. 1–4.

"Polymer Technology Overview." Optical Crosslinks, Incorporated. 2001. pp. 1–10. Retrieved from internet: <URL: http://www.opticalcrosslinks.com/pdf/WebPolymer/TECHNOLOGyPlatform.pdf>.

"Polymer Technology: Performance Data and Design Considerations." Optical Crosslinks, Incorporated. 2001. pp. 1–9. Retrieved from internet: <URL: http://www.opticalcrosslinks.com/pdf/WebPerformanceDataDesignTECHNOLGY.pdf>.

* cited by examiner

*Primary Examiner*—Frank G. Font
*Assistant Examiner*—Christopher M. Kalivoda
(74) *Attorney, Agent, or Firm*—Grossman & Flight, LLC

(57) ABSTRACT

Optoelectronic packages and methods to simultaneously couple an optoelectronic chip to a waveguide and substrate using conventional flux soldering processes are disclosed. A disclosed optoelectronic package includes a substrate, a waveguide mounted on the substrate, an optoelectronic chip having electrically conductive contacts coupled to the substrate via a metallic solder and an optical element located on the optoelectronic chip and coupled to the waveguide via an optical solder which protects the optical element during a metallic soldering of the optoelectronic chip to the substrate.

31 Claims, 2 Drawing Sheets

OPTOELECTRONIC PACKAGES AND METHODS TO SIMULTANEOUSLY COUPLE AN OPTOELECTRONIC CHIP TO A WAVEGUIDE AND SUBSTRATE

FIELD OF THE DISCLOSURE

The present disclosure relates generally to optical packages and, more particularly, to methods to simultaneously optically and electrically couple an optoelectronic chip to a waveguide and substrate.

BACKGROUND

Optical packages are typically manufactured using traditional methods that enable optoelectronic chips to communicate with other optoelectronic chips using optical signal transmissions. These traditional methods often include wire-bonding and/or flip-chip packaging processes. It is known that these optical packages are generally used in an optical communication system for transmitting and receiving high bandwidth optical signals.

Optical wire-bond packages and optical flip-chip packages both generally include an optoelectronic chip, a substrate and a light conducting element such as, for example, an optical fiber or a waveguide. The optoelectronic chip includes an optical element and electrically conductive contacts. The optical element, which may include a transmitter and/or receiver, is generally responsible for transmitting and/or receiving optical signals through the optical fiber and/or waveguide. The optical fiber and/or waveguide is generally adhered or attached to a substrate. Additionally, electrically conductive contacts are electrically bonded to a substrate for transmitting and/or receiving electrical signals.

A wire-bonding packaging process is generally carried out by individually bonding each electrically conductive contact of an optoelectronic chip to a substrate using wire (e.g., gold wire, aluminum wire, etc.) and a wire-bonding machine. This is a time consuming process. The time required to wire-bond each optical package impacts the overall time and cost related to implementing and executing the wire-bonding package manufacturing process. In addition to limitations during the manufacturing process, wire-bonding packaging may suffer from quality and reliability issues of the wire-bond. A typical wire-bond generally has an overall length associated with a distance measured from the optoelectronic chip electrical contact to the substrate. The overall length of the wire-bond may introduce electrical inductance and capacitance, thereby creating undesirable signal bandwidth limitations and signal loss. Additionally, the wire-bond may also be susceptible to quality defects, such as, for example wire-bond breaks or wire-bond detachment. The manufacturing and performance limitations presented here have lead many chip manufacturers to turn to alternate packaging techniques such as flip-chip packaging.

It is known that optical flip-chip packaging is a proven method for manufacturing optical packages. A flip-chip package may include a waveguide that is adhered to a substrate and that is disposed between an optoelectronic chip and the substrate. During a bonding process, the optoelectronic chip is positioned relative to the waveguide using an active alignment process to achieve optimal light signal transmission through the waveguide, thus adding time and cost to the overall flip-chip packaging process. Additionally, the optical flip-chip packaging process generally results in an air gap disposed between the optical element and the waveguide. The air gap results in a chip-air interface and an air-waveguide interface. Fressnel losses and/or beam divergence often occur when light crosses such interfaces. Also, due to the air gap, fluxless soldering processes are generally used to form electrical bonds to prevent flux residues from contaminating an optical path (i.e., the air gap) between the optical element and the waveguide, thereby preventing optical signal loss.

DETAILED DESCRIPTION

Figure 1:
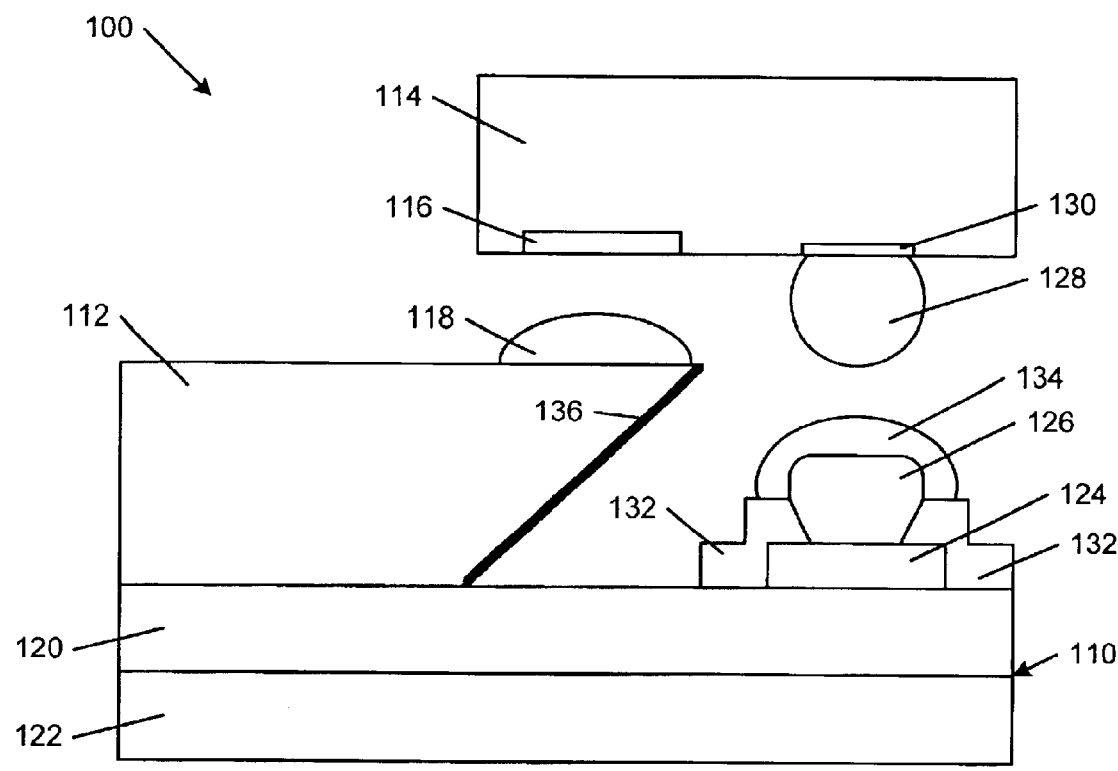
FIG. 1 is a cross-sectional view of an example optical package shown prior to undergoing a soldering process.

FIG. 1 is a cross-sectional view of an example optical package 100 prior to assembly. The example optical package 100 includes a substrate 110, a waveguide 112 mounted on the substrate 110, and an optoelectronic chip 114 bonded to the substrate 110. As explained in detail below, the optoelectronic chip 114 includes an optically active area 116 (otherwise known as an optical element) which is optically coupled to the waveguide 112 via an optical solder 118. In the illustrated example, the optical element 116 is bonded to the waveguide 112 via the optical solder 118.

The substrate 110 illustrated in FIG. 1 may be implemented by any type of substrate. Thus, the substrate 110 may be formed from any desired type of material. For example, the substrate 110 may be made of an insulative, non-conductive material. The substrate 110 may also have any desired form. In the illustrated example, however, the substrate 10 is made from an Ajinomoto Build-up Film (ABF) dielectric material 120 layered on a substantially general composite substrate 122 and includes a generally planar surface conducive to flip-chip bonding and/or waveguide coupling.

In addition, the substrate 110 may include one or more circuits or portions of circuits. For instance, circuit lines or traces may be printed on or layered within the substrate 110. To couple circuit elements (e.g., an integrated circuit, a capacitor, an inductor, etc.) to the circuit lines or traces, the substrate 110 may further be provided with electrically conductive contacts 124. Solder bumps 126 may be deposited on one or more of the electrically conductive contacts 124 to facilitate bonding of circuit elements to the substrate 110. The solder bumps 126 may be made of any conventional and/or metallic soldering material (e.g., tin, lead, silver, etc.). A solder resistant mask (SRM) 132 may surround the electrically conductive contacts 124 and the solder bumps 126 to prevent the solder bumps 126 from bonding to anything other than corresponding solder bumps. A flux material 134 may be dispensed on the substrate solder bumps 126 to deoxidize the solder bumps 126 at elevated bonding temperatures, thus ensuring proper bonding.

By way of a more specific example, the substrate 110 may be implemented by a printed circuit board (PCB) substrate. The PCB may be provided with a chip-bonding surface adapted to mount a flip-chip using flip-chip on board (FCoB) bonding. In such an example, the chip-bonding surface is provided with electrically conductive contacts which are communicatively connected to electrically conductive traces printed on and/or in the PCB substrate.

In another example, the substrate 110 is implemented by a flex substrate such as a flexible PCB substrate. A flex substrate generally has material properties that enable bending or flexing of the substrate. The bendability of a flex substrate makes it particularly useful in mechanically demanding environments. The flex substrate may be provided with a chip-bonding surface adapted to mount a flip-chip using flip-chip on flex (FCoF) bonding. In such an example, the chip-bonding surface includes electrically conductive contacts that are communicatively connected to electrically conductive traces which are printed on and/or in the flex substrate.

In still another example, the substrate 110 is implemented by a chip-package substrate such as a flip-chip package (e.g., a FCPGA package). A flip-chip package includes electrically conductive contacts on a chip-bonding surface. These contacts are communicatively connected to a second set of electrically conductive contacts on an opposite surface of the chip-package substrate. The second set of contacts may be coupled, for example, to traces on a PCB.

The waveguide 112 can be implemented by any type of waveguide. For example, the waveguide 112 may be implemented by a planar waveguide or an optical fiber. In the illustrated example, the waveguide 112 is a planar waveguide which may include two cladding layers (not shown), a waveguide core (not shown) disposed between the two cladding layers, and a mirror 136. The mirror 136 may be implemented in any desired manner. For example, the mirror 136 may be formed by cleaving, laser ablating or microtoming an end of the waveguide 112. The mirror 136 may also be metallized to promote reflection and reduce loss.

Persons of ordinary skill in the art will readily appreciate that any technique for adhering or otherwise mounting the waveguide 112 to the substrate 110 may be employed. For example, the waveguide 112 may be coupled to the substrate 110 via an adhesive layer (not shown). Furthermore, the waveguide 112 is positioned on the substrate 110 so that when an array of solder bumps 128 of the optoelectronic chip 114 are aligned to the array of solder bumps 126 of the substrate 110, the optical element 116 is aligned to the waveguide 112 to achieve optimal optical transmittance.

The optoelectronic chip 114 may be implemented by any desired integrated circuit having any desired purpose or functionality. In the illustrated example, the optoelectronic chip 114 is implemented by a flip-chip. The flip-chip 114 includes an optical element 116 such as a receiver, a transmitter or a transceiver. The optical element 116 may be mounted on an outer surface of the flip-chip package as shown in FIG. 1, or mounted internally of the flip-chip 114 and optically accessed via an optical aperture (not shown) such as, for example, a sealed window. The optical element 116 or optical aperture may be coupled to the top surface of the example waveguide 112 via the optical solder 118.

The optical solder 118, which may be a polymeric optically transparent adhesive, is dispensed on the top surface of the waveguide 112 so that, during a soldering process, the flip-chip 114 is optically bonded or optically coupled to the waveguide 112 via the optical solder 118. Material properties of the optical solder 118 make it highly compatible with the flip-chip bonding process. For example, due to its thixotropic properties, once the optical solder 118 is dispensed it remains in a fixed position until it is engaged by the flip-chip 114 during a soldering process. In another example, due to its low modulus properties after being cured, when the optical solder 118 is engaged by the flip-chip 114, the optical solder 118 will not generate structural stress and will not damage the optical element 116. Also, some optical solders 118 have a thermal curing temperature substantially equal to a melting temperature of the solder bumps 126. As a result, the optical solder may snap thermal cure during a soldering of the solder bumps 126. Furthermore, the optical solder 118 is optically transparent at a predefined wavelength allowing light of the predefined wavelength to pass between the optical element 116 and the waveguide 112.

In the illustrated example, at least a portion of the bottom surface of the flip-chip 114 directly engages the optical solder 118. Additionally, at least a portion of the bottom surface of the flip-chip 114 includes the solder bumps 128 that are deposited on die electrical contacts 130. Furthermore, the flip-chip 114 is coupled to the substrate 110 via the solder bumps 126, 128.

During a flip-chip bonding process, the flux material 134 is dispensed on the substrate solder bumps 126 and the flip-chip 114 of FIG. 1 is positioned on the substrate 110 so that each flip-chip solder bump 128 is aligned with a respective one of the substrate solder bumps 126. Additionally, the flip-chip 114 is positioned at least partially on the optical solder 118, which may be done using a pick and place machine. The optical solder 118 is, thus, at least partially disposed between the waveguide 112 and the flip-chip 114 prior to the metallic soldering to prevent the flux material 134 and any flux residue (not shown) from contaminating the optical path between the optical element 116 and the waveguide 112 during the soldering process. Furthermore, in the illustrated example, the waveguide 112 is positioned on the substrate 110 so that the mirror 136 is positioned to reflect light between the optical element 116 and the waveguide 112.

Figure 2:
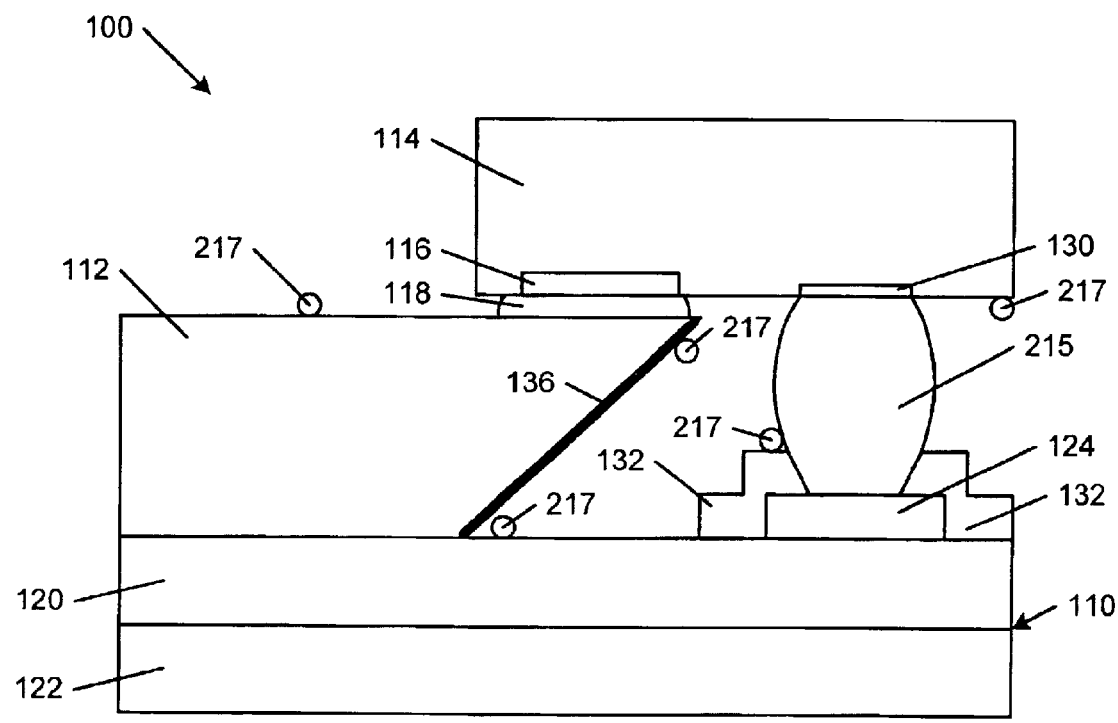
FIG. 2 is a side view of the example optical package of FIG. 1, but showing the package after having undergone a soldering process.

The soldering process associated with the flip-chip bonding process includes heating and cooling (or letting cool) the solder bumps 126, 128 so that they melt and bond to each other to form solder bonds 215 as shown in FIG. 2. More specifically, the flip-chip solder bumps 128 bond to a respectively aligned one of the substrate solder bumps 126 to form the solder bonds 215. Any or all of the substrate 110, the waveguide 112 and/or the flip-chip 114 may be heated either directly or indirectly as a result of the soldering process. Consequently, the substrate 110, the waveguide 112 and the flip-chip 114 should be structured to withstand the temperatures associated with the soldering process without sustaining damage.

During the bonding process, melting and hardening the solder bumps 126, 128 tends to draw the flip-chip 114 and the substrate 110 together in alignment due to a surface tension of the molten solder bumps 126 and 128. This process of alignment may be referred to as solder self-alignment. Also during the soldering process, the optical solder 118 is snap thermal cured to form an optical solder joint 118 between the flip-chip 114 and the waveguide 112. As a result of the bonding process, an optical bond is formed between the flip-chip 114 and the waveguide 112 as electrical bonds are simultaneously formed between the flip-chip 114 and the substrate 110. Additionally, some residue flux material 134 is scattered throughout the example optical package 100 in the form of flux residue particles 217. During a defluxing process, a defluxing material is flooded throughout the example optical package 100 to remove the flux residue particles 217. The optical solder 118 protects the optical element 116 from being damaged by the flux residue particles 217 both before and during the defluxing process.

Figure 3:
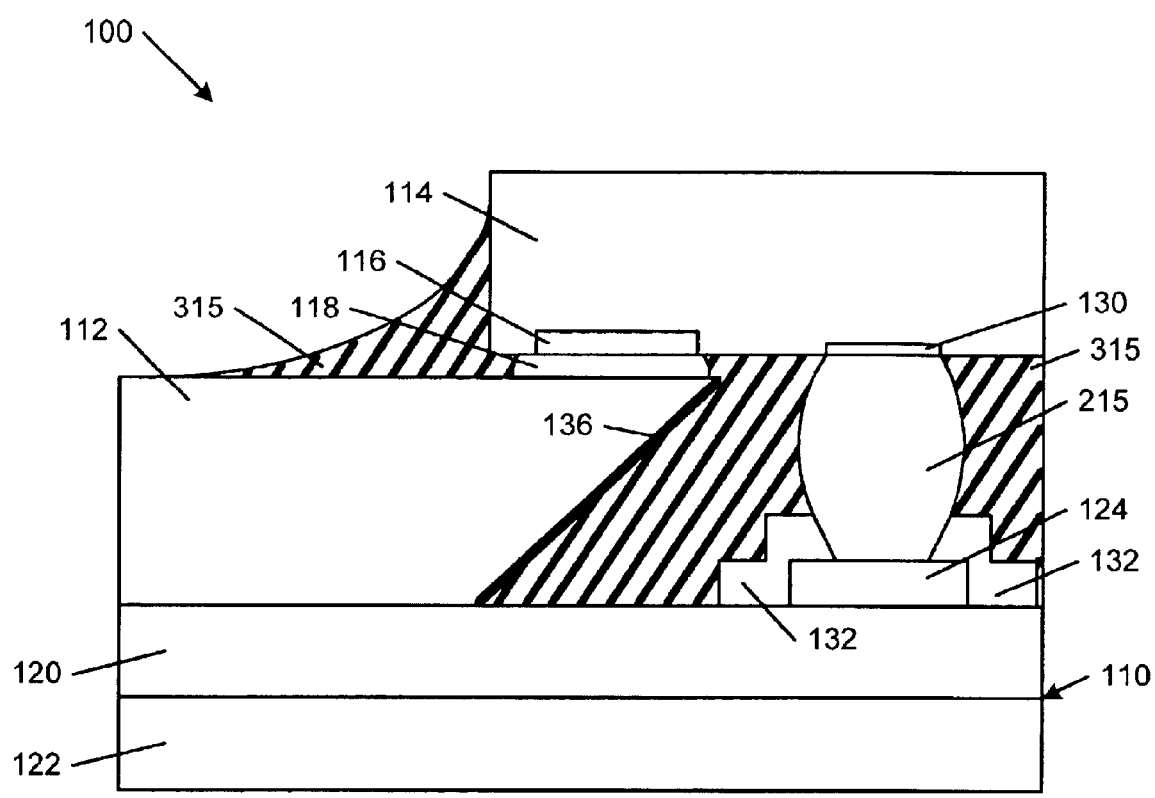
FIG. 3 is a side view of the example optical package of FIG. 1, but showing the package after having undergone a defluxing process and an underfilling process.

Following the defluxing process, an underfill 315 is disposed between the flip-chip 114 and the substrate 110 as shown in FIG. 3. The underfill 315 may comprise a non-conductive material and may be used to fill any space or spaces in the area(s) between the flip-chip 114 and the substrate 110. Because the optical solder 118 is disposed between the optical element 116 and the waveguide 112, the underfill 315 and other contaminants are prevented from entering between those elements and, thus, do not interfere with the optical coupling of the optical element 116 and the waveguide 112.

In addition to preventing entry of contaminants, coupling the optical element 116 and the waveguide 112 via the optical solder 118 is advantageous in several respects. For example, a gap between the flip-chip 114 and the waveguide 112 would result in a chip-air interface and an air-waveguide interface. Fresnel losses and/or beam divergence often occur when light crosses such interfaces. Therefore, because the index of refraction of the optical solder 118 substantially matches the index of refraction of the optical element 116 and the index of refraction of the waveguide 112, coupling the optical element 116 and the waveguide 112 via the optical solder 118 may reduce or eliminate Fresnel losses and beam divergence otherwise associated with chip waveguide interfaces.

Although certain example methods, apparatus and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. An apparatus comprising:
   a substrate;
   a waveguide mounted on the substrate;
   an optoelectronic chip having electrically conductive contacts coupled to the substrate via a metallic solder; and
   an optical element located on the optoelectronic chip and coupled to the waveguide via an optical solder which protects the optical element during a metallic soldering of the optoelectronic chip to the substrate.

2. An apparatus as defined in claim 1, wherein the optoelectronic chip is a flip-chip.

3. An apparatus as defined in claim 1, wherein the optical element comprises a transceiver, a receiver or a transmitter.

4. An apparatus as defined in claim 1, wherein the optical solder is at least one of a polymer optical solder, an optically transparent adhesive at a predefined wavelength, a dispensable material, a thixotropic material and a low modulus material.

5. An apparatus as defined in claim 1, wherein a refraction index of the optical solder approximately matches a refraction index of the waveguide and a refraction index of the optical element.

6. An apparatus as defined in claim 1, further comprising an underfill material disposed between the optoelectronic chip and the substrate.

7. An apparatus as defined in claim 6, wherein the underfill material is not disposed between the optical element and the waveguide.

8. An apparatus as defined in claim 1, wherein the waveguide includes a mirror.

9. An apparatus as defined in claim 8, wherein the mirror is a metallized mirror.

10. An apparatus as defined in claim 1, wherein the waveguide is a planar waveguide.

11. An apparatus as defined in claim 1, wherein the optical solder protects the optical element from being contaminated by flux residue during the metallic soldering and from being damaged during defluxing.

12. An apparatus comprising:
    a substrate;
    a flip-chip having an optically active area;
    a waveguide at least partially disposed between the substrate and the flip-chip;
    electrically conductive contacts located on the flip-chip and coupled to the substrate via a metallic solder; and
    an optical solder bonding the optically active area of the flip-chip to the waveguide via an optical solder which protects the optically active area during metallic soldering of the flip-chip chip to the substrate.

13. An apparatus as defined in claim 12, wherein the optical solder has a thermal curing temperature substantially equal to a melting temperature of the metallic solder.

14. An apparatus as defined in claim 12, wherein the optical solder is at least one of a polymer optical solder, an optically transparent adhesive at a predefined wavelength, a dispensable material, a thixotropic material and a low modulus material.

15. An apparatus as defined in claim 12, wherein the optical solder covers the optically active area.

16. An apparatus as defined in claim 12, wherein when cured, the optical solder forms an optical solder joint between the flip-chip and the waveguide.

17. An apparatus as defined in claim 12, wherein facing surfaces of the flip-chip and the substrate are electrically connected.

18. A method of mounting a flip-chip to a substrate comprising:
    attaching a waveguide to the substrate;
    dispensing an optical solder onto the waveguide;
    aligning the flip-chip at least partially on the substrate and at least partially on the optical solder; and
    soldering the flip-chip to the waveguide and the substrate simultaneously such that the optical solder couples an optically active area of the flip-chip to the waveguide and solder bumps couple the flip-chip to the substrate.

19. A method as defined in claim 18, further comprising dispensing flux on the substrate.

20. A method of manufacturing as defined in claim 19, further comprising defluxing at least one of the substrate, the flip-chip and the waveguide.

21. A method as defined in claim 18, wherein soldering the flip-chip to the substrate comprises capturing the optical solder between the flip-chip and the waveguide.

22. A method as defined in claim 18, wherein soldering the flip-chip to the substrate comprises forming an optical solder joint between the flip-chip and the waveguide.

23. A method as defined in claim 18, wherein soldering the flip-chip to the substrate comprises snap thermal curing the optical solder.

24. A method as defined in claim 18, wherein soldering the flip-chip to the substrate comprises electrically connecting the flip-chip and the substrate.

25. A method as defined in claim 18, wherein soldering the flip-chip to the waveguide and the substrate comprises optically connecting the die to the waveguide and electrically connecting the flip-chip to the substrate simultaneously.

26. A method as defined in claim 18, further comprising disposing an underfill material between the flip-chip and the substrate.

27. A method as defined in claim 26, wherein the optical solder prevents the underfill material from entering between the optically active area of the flip-chip and the waveguide.

28. A method as defined in claim 18, further comprising aligning and placing the flip-chip at least partially on the substrate and at least partially on the optical solder using a pick and place machine.

29. A method as defined in claim 18, wherein soldering the flip-chip and the waveguide comprises covering the optically active area of the flip-chip with the optical solder.

30. A method as defined in claim 18, wherein the refraction indices of the optically active area, the optical solder and the waveguide substantially match.

31. A method as defined in claim 18, wherein soldering the flip-chip to the waveguide and the substrate simultaneously comprises solder self-aligning the flip-chip with the waveguide and the substrate.

* * * * *